United States Patent Office 3,536,768
Patented Oct. 27, 1970

3,536,768
TREATMENT OF SPENT GLYCOL
James W. Pitts, Port Neches, Tex., assignor to Jefferson Chemical Company, Inc., Houston, Tex., a corporation of Delaware
No Drawing. Continuation of application Ser. No. 565,728, July 18, 1966. This application Sept. 18, 1967, Ser. No. 668,673
The portion of the term of the patent subsequent to Jan. 20, 1987, has been disclaimed
Int. Cl. C07c *29/24;* C08g *17/06*
U.S. Cl. 260—637            4 Claims

ABSTRACT OF THE DISCLOSURE

In the preparation of terephthalate polyesters, it is necessary to employ an excess of ethylene glycol which is recovered at the completion of the reaction. The recovery of ethylene glycol from the spent glycol solutions containing various ester impurities can be more efficiently accomplished by pretreating the spent glycol with ammonia, primary amines, secondary amines and amine residues, containing primary and secondary amines, to convert the esters in the spent glycol to amides and alcohols.

CROSS REFERENCE TO RELATED APPLICATION

This application is a continuation-in-part of my application Ser. No. 565,728, filed July 18, 1966, for "Treatment of Spent Glycol."

DESCRIPTION OF THE INVENTION

This invention concerns the treatment of a spent glycol stream to facilitate recovery of the ethylene glycol content. More particularly, this invention concerns the treatment of a spent glycol stream to convert the esters in the stream to amides and alcohols, thus facilitating recovery of the ethylene glycol. The spent glycol stream is treated by contacting it with ammonia, primary amines, secondary amines and mixtures thereof. When it is said that mixtures of primary and secondary amines are suitable, it will be understood that the treatment may also be performed by using residues from manufacture of various amines such as, for example, morpholines, which contain therein primary and secondary amine groups, in addition to some tertiary amines and other functional groups such as, for example, hydroxyl groups. I have discovered that any of these above compounds perform satisfactorily in the practice of my invention.

The manufacture of a polymeric polyester by the reaction of ethylene glycol and dimethylterephthalate generally results in a residual glycol stream contaminated with dimethylterephthalate and other esters and impurities including, at times, water and methanol. This contaminated glycol is often referred to by the trade as "spent glycol." Spent glycol normally contains 80% to 98% ethylene glycol. Approximately one-half of the ethylene glycol employed in the polyesterification reaction is to be found in the spent glycol stream. Thus, the recovery of the ethylene glycol from this stream plays an important part in the economics of the polyesterification reaction.

Heretofore, spent glycol has been upgraded by the addition of about 25% water, followed by separation of the water, solids and methanol from the glycol by distillation. However, it has been found that the dimethylterephthalate, and perhaps other esters in the glycol, azeotropes with the water during distillation and tends to plug pumps, lines, exchangers and other equipment in the overhead of the still.

I have now discovered that this fouling problem can be overcome by treatment of the spent glycol containing ester impurities prior to the distillation with ammonia, primary amines, secondary amines and mixtures thereof. These amine mixtures can also be residues from the manufacture of various amine products which contain primary and secondary amines. The distillation is still facilitated by the addition of sufficient amounts of water, and water is preferably added prior to distillation either before or after the treatment of my invention. Since the water added is then removed by distillation, the maximum amount to be added is dictated by economic considerations.

Either anhydrous ammonia or ammonium hydroxide may be employed in the treatment of the spent glycol stream. The amount of ammonia employed should be at least the stoichiometric amount necessary to substantially completely convert all esters present to the corresponding amides and alcohols. Preferably, an excess of ammonia such as, for example, a 20% excess is employed. An even greater excess may be employed if desired. The amount of ester present will vary from one batch of spent glycol to another. However, for any particular batch, the amount of ester present can be readily determined by analysis and the stoichiometric amount of ammonia calculated.

When it is desired to use the primary amines, secondary amines or mixtures thereof in the treatment of the spent glycol, amines should be selected that do not have boiling points within the range at which the purified ethylene glycol will be distilled and recovered. This is to avoid any contamination of the recovered ethylene glycol with the amine used to convert the ester impurities to the corresponding amide. The quantity of amine to be added in the treatment of my invention is determined in the same manner as the quantity of ammonia to be used, as discussed above. When ammonia is used in the reaction an excess such as, for example, 20% may be desirably employed, even though a lesser or greater excess may be employed if desired.

In the same manner also, residues containing primary and secondary amine groups may be used within the scope of my invention to treat the ester impurities of the spent glycol. Satisfactory amine residues often occur in the manufacture of such amine products as, for example, morpholine, triethanolamine, piperazine, triethylenediamine, and so forth. These residues may also have other functional groups in them such as, for example, hydroxyl groups, but this does not deleteriously affect the amide-forming reaction in the spent glycol. The quantity to be added is determined as discussed above.

As mentioned above, the criteria upon which to base the use of an amine-containing residue is the presence of primary or secondary amines. Tertiary amines may be present to a lesser or greater extent, but the tertiary amine takes no part in the reaction with the ester impurities in the spent glycol. Therefore, a determination of a functional analysis of likely amine residues is desirable to determine the applicability in the process of my invention and to ascertain the amount of residue to add. An example of the type of analysis of a typical residue found to be satisfactory is as follows:

Equivalent weight _____ 130
Total amine, meq./g. _____ 8
Primary amine, meq./g. _____ 2
Secondary amine, meq./g. _____ 1
Tertiary amine, meq./g. _____ 5
Hydroxyl number _____ 245

The foregoing analysis is presented for purposes of illustration only and my invention is not to be limited thereto.

Since the content of the various amine residues may vary widely, it will be understood that the presence of the primary and secondary amines is the primary consideration.

The reaction of the hydrogen atom of the amine with the ester to form the corresponding amide alcohol proceeds readily at any reasonable temperature. As to be expected, the required reaction time decreases with an increase in temperature so that it might be desirable to conduct the reaction at an elevated temperature in order to reduce the reaction time. However, I have found it convenient to mix the ammonia or amine with the spent glycol and let the mixture stand for from 24 to 48 hours at ambient temperature but in some cases two hours have been found to be sufficient. Thus, the ammonia or amine may be added to spent glycol in storage, allowing the reaction to occur prior to the distillation of the spent glycol stream.

My invention will be further illustrated by the following specific examples, which are illustrative only and are not intended to limit the invention.

EXAMPLE I

Spent glycol (500 grams), containing 85% ethylene glycol, from the reaction of dimethylterephthalate and ethylene glycol was stirred with two grams of 29.7% aqueous ammonia for 36 hours in a closed vessel at atmospheric pressure and ambient temperature (20–35° C.). The mixture was then diluted with 100 ml. of water dewatered on a 1″ x 12″ packed column at atmospheric pressure and a reboiler temperature of 200° C. and ethylene glycol was then recovered from the dewatered crude on the same column at an overhead temperature of 96° C. and 12 mm. pressure. There was no fouling or plugging of either the still bottoms or overhead system. In another test run, following the same procedure but omitting the ammonolysis step, plugging of the overhead product line became so severe that the distillation had to be discontinued.

It is an advantage of my invention that the recovery of ethylene glycol is essentially quantitative. The only losses that occur are due to column holdup and the normal handling losses. Further, the still bottoms from the distillation are liquid, so that it is unnecessary to add a chaser to the distillation.

EXAMPLE II

Spent glycol (750 grams) containing 85% ethylene glycol from the reaction of dimethylterephthalate and ethylene glycol was stirred with 0.75 gram of triethylene tetraamine for two hours in a closed vessel at atmospheric pressure and ambient temperature (20–35° C.). The mixture was then diluted with 75 ml. of water, dewatered on a 1″ x 12″ packed column at atmospheric pressure and a reboiler temperature of 200° C., and ethylene glycol was then recovered from the dewatered spent by distillation at an overhead temperature of 87° C. and 7 mm. pressure. There was no fouling or plugging of either the still bottoms or overhead system.

EXAMPLE III

Spent glycol (500 grams) containing 85% ethylene glycol from the reaction of dimethylterephthalate and ethylene glycol was stirred for two hours in a closed vessel at atmospheric pressure and ambient temperature (20–35° C.) with 2.5 grams of an amine residue having the following functional analysis.

Equivalent weight ........................................ 126
Total amine, meq./g. ..................................... 7.9
Primary amine, meq./g. ................................... 1.3
Secondary amine, meq./g. ................................. 0.7
Tertiary amine, meq./g. .................................. 5.9
Hydroxyl number .......................................... 245

The mixture was then diluted with 100 ml. of water, dewatered on a 1″ x 12″ packed column at atmospheric pressure and ethylene glycol was then recovered from the dewatered spent by distillation at an overhead temperature of 100° C. and 15 mm. pressure. There was no fouling or plugging of either the still bottoms or overhead system.

EXAMPLE IV 500 grams of spent glycol containing 85% ethylene glycol was diluted with 100 grams of water and distilled on a 1″ x 12″ packed column at atmospheric pressure. Plugging of the overhead was so severe that distillation had to be discontinued.

I claim:
1. A method for the recovery of purified ethylene glycol from a spent glycol containing ester impurities which comprises treating the spent glycol with at least a stoichiometric amount of a nitrogen containing compound selected from the group consisting of
    (a) ammonia;
    (b) ammonium hydroxide;
    (c) triethylenetetramine; and
    (d) a mixture containing primary and secondary amine groups, obtained as a residue in the manufacture of an amine product selected from the group consisting of morpholine, triethanolamine, piperazine and triethylenediamine,
   thereby reacting the ester impurities to form the corresponding amides and alcohols by allowing the mixture to stand at ambient temperatures for 2 to 48 hours; and distilling the spent glycol to recover the purified ethylene glycol, wherein water is added prior to the distillation step.
2. The method of claim 1 wherein the amine is triethylenetetramine.
3. The method of claim 1 wherein the nitrogen-containing compound is a mixture containing primary and secondary amine groups, obtained as a residue in the manufacture of an amine product selected from the group consisting of morpholine, triethanolamine, piperazine and triethylenediamine.
4. The method of claim 3 wherein the nitrogen-containing compound is a residue from the manufacture of morpholine.

References Cited

UNITED STATES PATENTS

| | | | |
|---|---|---|---|
| 819,646 | 5/1906 | Glatz | 260—404 |
| 2,143,478 | 1/1939 | Engs et al. | 260—643 |
| 2,756,199 | 7/1956 | Smith | 260—643 |
| 2,793,235 | 5/1957 | Jenkinson | 260—637 |
| 2,822,409 | 2/1958 | Gwynn et al. | 260—643 |

FOREIGN PATENTS

| | | |
|---|---|---|
| 801,723 | 9/1958 | Great Britain. |
| 1,189,537 | 3/1965 | Germany. |

OTHER REFERENCES

Lascaray: J. of the Am. Oil Chemists Society, vol. 29 (1952), pp. 362–6.

BERNARD HELFIN, Primary Examiner

J. E. EVANS, Assistant Examiner

U.S. Cl. X.R.

260—559